Aug. 15, 1933.  L. C. FRANK  1,922,200

AIR COOLED COMBUSTION ENGINE

Filed Sept. 15, 1931

WITNESSES:

INVENTOR
Leo C. Frank.
BY
ATTORNEY

Patented Aug. 15, 1933

1,922,200

UNITED STATES PATENT OFFICE 1,922,200

AIR COOLED COMBUSTION ENGINE

Leo C. Frank, McKeesport, Pa., assignor to Westinghouse Electric & Manufacturing Company, a Corporation of Pennsylvania Application September 15, 1931
Serial No. 562,836

2 Claims. (Cl. 123—171)

My invention relates to internal combustion air-cooled engines, and it has for its object to divert a portion of the air from the cooling system for use in the fuel mixture.

Another object of my invention is to provide for delivering air under pressure to the carburetor of an internal combustion engine, thereby obtaining good performance and high efficiency.

It is also an object of my invention to provide for reducing to a minimum the suction noises caused by the carburetor.

A further object of my invention is to provide for cleaning the air before it enters the carburetor.

Other objects of the invention will hereinafter become apparent.

For a fuller understanding of the nature and the objects of the invention, reference should be had to the following description taken in connection with the accompanying drawing, in which.

Figure 1:
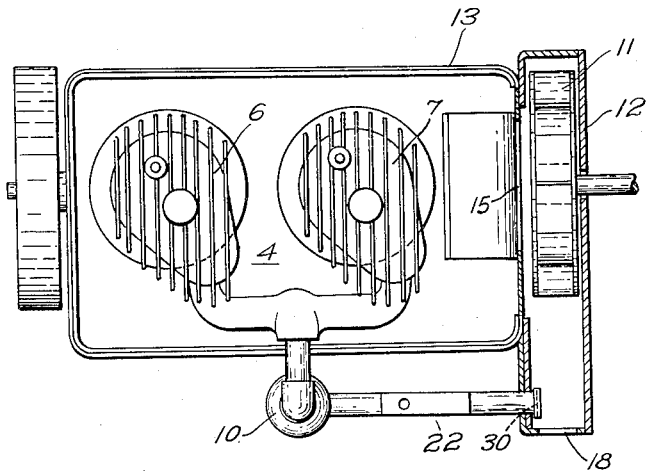
Figure 1 is a plan view, partly in section, of an internal combustion engine embodying the features of my invention.
Figure 2:
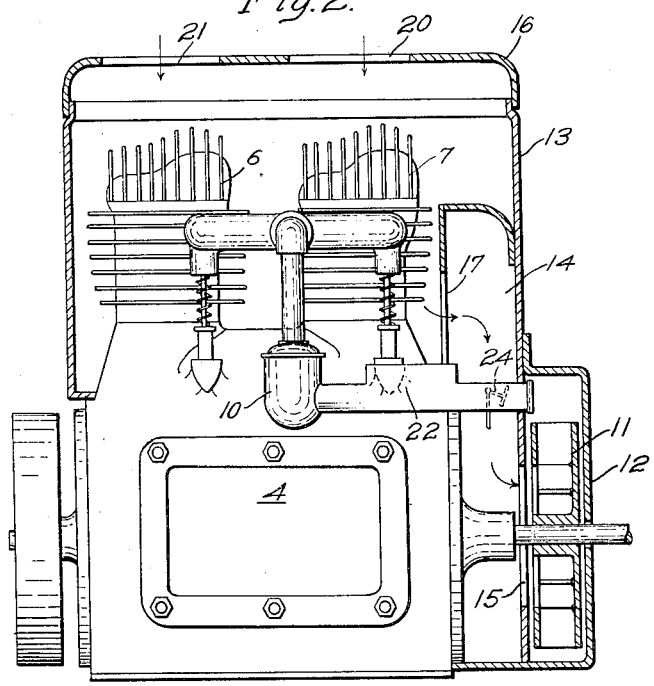
Fig. 2 is a side elevational view, partly in section, of the internal combustion engine shown in Fig. 1.

Referring to the drawing, the reference character 4 represents an internal combustion engine having a carburetor 10, a fan 11 for motivating a cooling medium, and a housing 12 therefor to which my invention may be applied.

As illustrated, the cylinders 6 and 7 of the engine are shielded by a lagging 13 which provides for directing a cooling medium to contact their surfaces and which is in communication with the fan housing 12 through an opening 17, an air passage 14 and a fan inlet 15. In order to provide means through which the cooling medium may pass from the atmosphere into the shielded space surrounding the cylinders, opening 20 and 21, respectively, are provided in the lagging cover 16 and located substantially above the cylinders 6 and 7.

Figure 3:
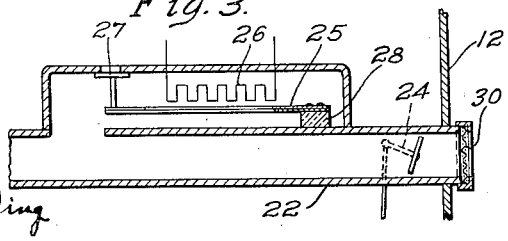
Fig. 3 is a longitudinal view, in section, of an air-inlet conduit that may be utilized to connect the carburetor to the fan housing of the engine.

For the purpose of utilizing a portion of the air from the fan 11, the carburetor 10 is connected in communication with the fan housing 12 through means of an air inlet conduit 22. Preferably, I have illustrated an air inlet conduit provided with a time-limit engine-choking device, as illustrated in Fig. 3, and covered by application for Letters Patent, Serial No. 424,616, filed January 30, 1930, by me as co-inventor with David J. Conant, and assigned to the assignee of this invention. However, it is to be understood that I do not intend to limit my invention to the illustrated type of air inlet conduit, since it is obvious that air inlet conduits of other types and construction may be utilized.

Briefly, the time limit engine choking device comprises a heating element 26, and a time-limit valve 27 operated by the free-end of a bimetal thermostat 25. The stationary-end of the thermostat 25 is securely mounted along a wall of the conduit 22 by means of a heat insulating block 28, so that it is not influenced by the ambient or engine temperature. The heating element 26 is energized only during the starting of the engine and, consequently, the free-end of the thermostat 25 opens the valve 27, which opening, in cooperation with the choke valve 24 provides a choking effect during the starting that gradually varies from a maximum to a minimum, regardless of the ambient temperature or the engine temperature.

When the engine is running, the fan 11 draws air through the openings 20 and 21, past the cylinders 6 and 7, and thence into the fan housing 12 through the opening 17, the passage 14 and the fan inlet 15. From the fan housing 12, a greater portion of the heated air is forced out to atmosphere through the fan outlet 18, but the remainder is forced into the air inlet conduit 22. A fine screen 30 is disposed at the entrance of the air inlet conduit 22, in order to clean the air before it enters the carburetor. In this connection, I find that the lubricant, which usually, during operation, accumulates on the cylinders, the valve springs and the like, collects substantially all of the particles from the air before it enters the fan housing. Also, I find that the particles of foreign matter which are not collected by the lubricant are directly carried, by the force of the air stream, out to atmosphere through the fan outlet 18.

It is manifest that several advantages are obtained by utilizing the heated air from the fan housing. One of the advantages is that the air is delivered to the carburetor under a pressure created by the fan, with the result that the engine develops more power than it would normally develop were the air admitted to the carburetor at atmospheric pressures.

Another advantage is that the air is preheated before it enters the carburetor and, in consequence, a good fuel mixture is attained. In other words, the fuel is highly atomized, that is to say, it is free of all globules, and, accordingly, a small amount of fuel is utilized for a given period of operation, since a good flame propagation is attained.

Aside from the foregoing advantages, the fan housing reduces the suction noise that is caused by the carburetor to a minimum. In other words, the fan housing 12 constitutes a muffler for the inlet conduit 22. The amelioration of the suction noise that is caused by the carburetor is of considerable importance in regard to farm-lighting plants. This is particularly true when the plant is located in the cellar or basement of the house.

I realize that various changes and modifications may be made in my invention without departing from the spirit and scope thereof, and I desire, therefore, that only such limitations shall be placed thereon as are imposed by the prior art or as are set forth in the appended claims.

I claim as my invention:

1. In combination, an internal combustion engine, a fan driven by said engine for motivating a cooling medium, an enclosure for said fan having an inlet and an outlet, a lagging for directing said cooling medium to contact a portion of said engine, said lagging being in communication with said fan inlet, a carburetor for said engine, means for effecting communication of the carburetor with said fan enclosure, and cleaning means disposed in such connecting means for cleaning the portion of the cooling medium passing to the carburetor.

2. In combination, an internal combustion engine, a fan driven by said engine for motivating a cooling medium, an enclosure for said fan having an inlet and an outlet, a lagging for directing said cooling medium to contact a portion of said engine, said lagging being in communication with said fan inlet, a carburetor for said engine, and means for effecting communication of the carburetor with said fan enclosure.

LEO C. FRANK.